July 7, 1964  W. B. LOEWENSTEIN  3,140,234
FAST REACTOR CORE
Filed Oct. 16, 1963
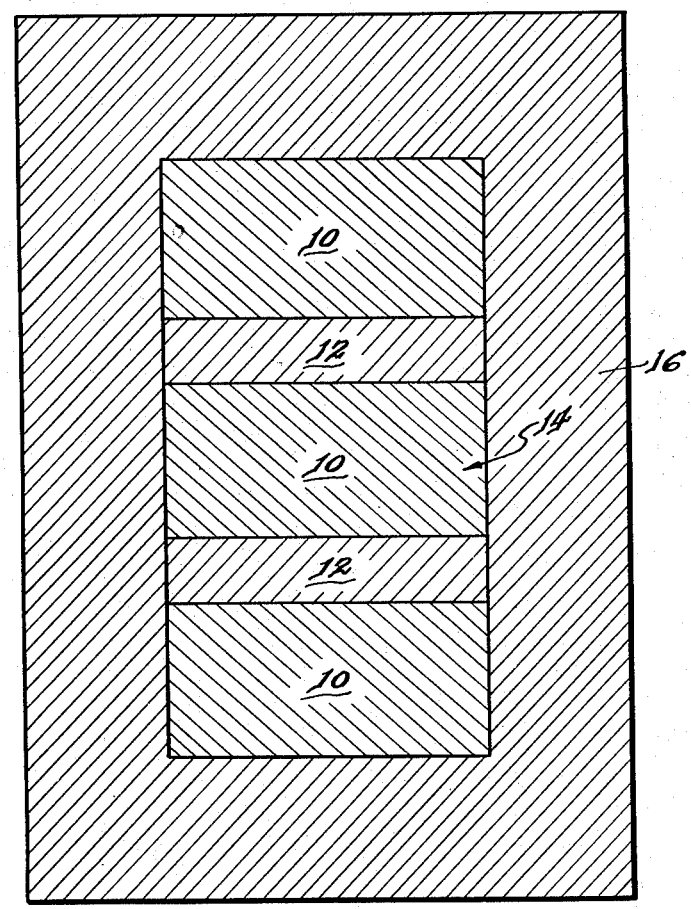
INVENTOR.
Walter B. Loewenstein
BY
Roland A. Anderson
Attorney 3,140,234
FAST REACTOR CORE
Walter B. Loewenstein, Elmhurst, Ill., assignor to the United States of America as represented by the United States Atomic Energy Commission
Filed Oct. 16, 1963, Ser. No. 316,784
3 Claims. (Cl. 176—17)

This invention relates to a nuclear reactor core. In more detail the invention relates to a very large fast reactor core which has a negative coolant void coefficient.

Relatively small fast reactors inherently have a negative coolant void coefficient; that is reactivity decreases with loss of coolant. A hazard which makes the design of large fast reactors difficult is the possibility that such reactors may have a positive coolant void coefficient; that is, reactivity would in crease with loss of coolant.

The reason that large reactors may have a positive coolant void coefficient whereas small reactors have a negative coolant void coefficient is that the effect observed is the resultant of two contradictory effects. When a fast reactor loses coolant, increased neutron leakage decreases the reactivity of the reactor. Also, however, hardening of the neutron energy spectrum (increase in average energy of the neutrons present in the core) increases the reactivity. In a small reactor core there is a net decrease in reactivity because loss of reactivity due to increased neutron leakage predominates. Such a reactor has a negative coolant void coefficient and can be operated without fear that loss of coolant will lead to melting of the fuel or a nuclear excursion.

As core size increases, neutron leakage becomes relatively of less importance until at some point, dependent on the material composition of the reactor core, the increase in reactivity due to hardening of the neutron spectrum predominates and the reactor core has a positive coolant void coefficient.

Such a situation must obviously be avoided and several suggestions have been made with this intent. One such suggestion is to increase the volume fraction of coolant within the reactor core thus enhancing the leakage effect. Such an expedient, however, offers limited compensation and results in a decreased power density.

Any fast reactor which has a positive coolant void coefficient can be constructed as taught herein to obtain a negative coolant void coefficient. With some core compositions the invention has no practical utility because a reactor of any practical size will have a negative coolant void composition. With other core compositions the invention has limited utility because of the great core size at which the coolant void coefficient becomes positive. For example, the invention will probably never have to be applied to a reactor employing heavy metals as coolant as such a reactor has a negative coolant void coefficient up to several thousand liters core size. Similarly the invention is of comparatively little importance at present in reactors incorporating U-235 as fuel because such reactors have a negative coolant void coefficient up to 1500 to 2000 liters. On the other hand, the invention does find utility as applied to light-metal-cooled, plutonium-239-fuel reactors having a core size of over about 800 liters. Danger from loss of coolant exists in reactors incorporating plutonium-239 as fuel at lower core sizes than in reactors incorporating uranium-235 as fuel because of the strong dependence of the capture-to-fission ratio on neutron energy by the Pu-239 istotope. In a reactor incorporating Pu-239 as fuel a slight increase in neutron energy, caused by a loss of coolant, decreases the ratio of neutron captures to neutron fissions, thus increasing reactivity. Thus hardening of the neutron spectrum results in a marked increase in reactivity in a Pu-239 reactor but a much lower increase in reactivity in a U-235 reactor because the decrease in capture-to-fission ratio with an increase in neutron energy is much more pronounced in Pu-239 than in U-235. Thus a U-235 reactor will have a negative coolant volume coefficient up to quite a large size.

It will be appreciated that this invention is only applicable to very large reactors. The smallest reactor that will have a positive coolant void coefficient has a core size of about 800 liters. In contrast to this figure, it can be noted that EBR-II has a core size of 65 liters. However, the future of atomic energy appears to reside in such large fast breeder reactors for it is only in such reactors that uranium reserves can be fully utilized economically.

It is accordingly an object of the present invention to develop a very large fast reactor having a negative coolant void coefficient.

It is a more specific object of the present invention to develop a very large, sodium-cooled, plutonium-fueled fast reactor having a negative sodium void coefficient.

The invention will be described specifically with respect to a sodium-cooled, plutonium-239-fuel fast reactor including 50% sodium in the core and having a core size of 1500 liters. In a reactor of this type and size the danger from a loss-of-coolant accident is very severe since the sodium void coefficient is substantially positive.

A reactor of this type and size constructed in accordance with the present invention will have a negative coolant void coefficient with no loss in breeding gain and at a reasonable expense in fuel inventory.

To accomplish this result the reactor core incorporates a plurality of subcritical cores nuclearly coupled by blankets of fertile material disposed therebetween. Preferably the reactor core comprises a plurality of slabs containing fuel material separated by slabs containing blanket material. Although the invention can also be applied to reactor cores of cylindrical or spherical geometry, a much greater fuel inventory penalty may be suffered in such cores than in a reactor having slab geometry.

The invention will next be described in connection with the accompanying drawing wherein the single figure is a diagram of a reactor core embodying the present invention.

According to a preferred form of the present invention three-slab-shaped core regions 10 are separated by blanket regions 12 to form the active portion 14 of a nuclear reactor. Active portion 14 is surrounded on all sides by a reflector 16. Each core region 10 is 48 cm. thick and 100 cm. square and contains 25 volume percent of plutonium, 25 volume percent of steel, and 50 volume percent of sodium. The total volume of all core regions 10 is 1500 liters. Each blanket region 12 is 20 cm. thick and 100 cm. square and contains 60 volume percent depleted uranium, 20 volume percent steel and 20 volume percent sodium, while reflector 16 is 45 cm. thick and also contains 60 volume percent depleted uranium, 20 volume percent steel, and 20 volume percent sodium.

The following table gives the result of computations which prove the effectiveness of the present invention.

*Table I*

| Number of Regions | | Axial Thickness of Region (cm.) | | Critical Enrichment of Fuel $\left[\dfrac{N^{Pu}}{(N^{Pu}+N^{U238})}\right]$ | | Reactivity Change for 30% Core Na Removal | |
|---|---|---|---|---|---|---|---|
| Core a | Reflector b | Core | Blanket c | Reference | 30% Na Removed d | Sign | Magnitude (percent ΔK/K) |
| 1 | 2 | 142 | —c | 0.08776 | 0.08763 | Positive | 0.033 |
| 2 | 3 | 71 | 10 | 0.10376 | 0.10405 | Negative | 0.143 |
| 2 | 3 | 71 | e10 | 0.10323 | 0.10350 | ___do___ | 0.130 |
| 2 | 3 | 71 | 5 | 0.09846 | 0.09842 | Positive | 0.0188 |
| 2 | 3 | 71 | 15 | 0.10595 | 0.10645 | Negative | 0.264 |
| 2 | 3 | 71 | 20 | 0.10681 | 0.10742 | ___do___ | -------- |
| 3 | 4 | 48 | 10 | 0.10717 | 0.10708 | Positive | 0.074 |
| 3 | 4 | 48 | 15 | 0.11441 | 0.11445 | Negative | 0.024 |
| 3 | 4 | 48 | 20 | 0.11972 | 0.12013 | ___do___ | 0.187 |
| 3 | 4 | 48 | 25 | 0.12340 | 0.12408 | ___do___ | -------- |
| 5 | 6 | 28 | 10 | 0.12422 | 0.12397 | Positive | 0.16 |
| 5 | 6 | 28 | 20 | 0.15245 | 0.15289 | Negative | -------- | a Core contains 25 v/o Pu-U metal, 25 v/o steel, 50 v/o Na.
b Blanket contains 60 v/o depl. U, 20 v/o steel, 20 v/o Na.
c Only Interspersed Blanket Regions. Outer Reflector always ~45 cm. thick.
d From Core Regions only.
e Blanket Region contains natural uranium.

The table gives the reactivity change accompanying a 30% loss in coolant. Since the purpose of the invention is to avoid a positive reactivity change and to promote the safety of the reactor, in general those reactor cores showing the highest negative reactivity change are the most satisfactory. In certain cases the magnitude of the reactivity change is not given because the method of computation could not be relied on to give realistic results.

It can be seen from the table that the character of the reactivity change may be markedly altered by providing several loosely coupled slabs of smaller thickness rather than one large slab core. In addition it can be seen that merely providing two or more slabs separated by a blanket of depleted uranium does not always produce the desired results. However, it is clear that the reactivity change for a reactor core comprising two 71-cm. thick slabs separated by either a 10 or a 15 cm. thick blanket is negative as is the reactivity change for three 48 cm. thick slabs separated by 15 or 20 cm. thick blankets. Since the reactivity change for a single 142 cm. thick slab is positive, utility of the invention is demonstrated.

It is difficult to establish accurate and uniformly applicable criteria for establishing the geometry of a reactor core which shows optimum benefits from the present invention. The optimum number of core regions and the width of the blanket regions separating them depend on the parameters of the particular reactor under investigation and even for a particular reactor may depend on engineering or nuclear considerations which are not apparent on initial analysis of the reactor.

Obviously, the blanket regions must be thick enough to obtain the effect desired—sufficient leakage of neutrons to obtain a negative reactivity change. According to Table I, a 5 cm. blanket is insufficient for a 1500 liter reactor of the described core composition. In addition it must be remembered that an increase in the thickness of the blanket necessitates increased fuel and that at some thickness the blanket decouples the separate core regions, thus losing any benefit from the present invention. Since each core region is substantially non-critical according to the present invention, complete decoupling would result in loss of criticality. It is believed that decoupling starts to occur when the blanket is increased to about 25 cm.

As shown in Table I, the number of core regions is not critical and may be two, three or possibly more for the described reactor. No definite indication of an optimum number can be found; however, increasing the number while maintaining the core volume constant increases the fuel inventory necessary for operation of the reactor.

For best results it is necessary to balance the desire for increased neutron leakage to provide a negative reactivity change on coolant loss against the increased fuel inventory made necessary by such neutron loss. The preferred embodiment of the invention was selected because it provides a suitable balance of these requirements and also because it can be scaled up to larger reactors without difficulty.

It will be noted that changing the blanket material from depleted uranium to natural uranium reduces the negative reactivity change which indicates the desirability of employing depleted uranium in the blankets.

In all cases, the provision of a negative change is at the expense of increased fuel requirements. However, the penalty is not nearly as great as that paid to construct several different reactors, each small enough individually to have a negative coolant void coefficient, producing the same power.

The breeding ratio of a reactor constructed according to the present invention is at least as good and perhaps better than a reactor of the same size constructed as a single slab. This follows because the neutron spectrum within the reactor is hardened by adding blanket regions because the blanket filters out the lower energy neutrons present in the reactor.

In addition the concentration of plutonium formed in the interspersed blanket regions is greater than in a conventional exterior blanket because neutrons approach the interspersed blanket regions from two directions. Therefore the concentration of plutonium obtained will be almost twice that obtained in an exterior blanket.

It will be understood that the invention is not to be limited to the details given herein but that it may be modified within the scope of the appended claims.

The embodiments of the invention in which an exclusive property of privilege is claimed are defined as follows:

1. A light-metal-cooled fast nuclear reactor core comprising a plurality of subcritical, slab-shaped fuel regions containing plutonium-239 loosely coupled by slab-shaped blanket zones containing depleted uranium disposed therebetween, the total volume of the fuel regions being over about 800 liters.

2. A nuclear reactor core comprising two slab-shaped fuel regions which are 71 cm. thick and 100 cm. square and contain 25 volume percent plutonium, 25 volume percent steel, and 50 volume percent sodium, a blanket zone which is between 10 and 15 cm. thick and 100 cm.

square and contains 60 volume percent depleted uranium, 20 volume percent steel and 20 volume percent sodium disposed between said fuel zones and a 45 cm. thick reflector containing depleted uranium surrounding said fuel and blanket regions.

3. A nuclear reactor core comprising three slab-shaped fuel zones which are 48 cm. thick and 100 cm. square and contain 25 volume percent plutonium-239, 25 volume percent steel and 50 volume percent sodium, a blanket zone which is between 15 and 20 cm. thick and is 100 cm. square and contains 60 volume percent depleted uranium, 20 volume percent steel and 20 volume percent sodium disposed between each pair of said fuel zones, and a 45 cm. thick reflector containing depleted uranium surrounding said fuel and blanket zones.

No references cited.